United States Patent
Pan et al.

(10) Patent No.: US 9,876,456 B2
(45) Date of Patent: Jan. 23, 2018

(54) BRUSHLESS ELECTRICAL MACHINE

(71) Applicant: ABB Schweiz AG, Baden (CH)

(72) Inventors: Zhiguo Pan, Cary, NC (US); Mario Schweizer, Zurich (CH); Ghanshyam Shrestha, Apex, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/170,420

(22) Filed: Jun. 1, 2016

(65) Prior Publication Data

US 2017/0353137 A1    Dec. 7, 2017

(51) Int. Cl.
*H02P 1/32*   (2006.01)
*H02P 25/22*   (2006.01)

(52) U.S. Cl.
CPC .................... *H02P 25/22* (2013.01)

(58) Field of Classification Search
CPC ......... H02P 27/06; H02J 3/1857; H02J 1/102; H02M 2007/4835
See application file for complete search history.

(56) References Cited

U.S. PATENT DOCUMENTS

| | | |
|---|---|---|
| 5,705,909 A | 1/1998 | Rajashekara |
| 7,733,039 B2 | 6/2010 | Su |
| 8,421,388 B2 | 4/2013 | Mukai |
| 2009/0146595 A1 | 6/2009 | Immler |
| 2009/0160378 A1* | 6/2009 | Hwang ................ F24F 11/008 318/400.3 |
| 2012/0038302 A1* | 2/2012 | Casimir ............ H02M 7/5388 318/400.27 |
| 2013/0049659 A1 | 2/2013 | Marquardt |
| 2015/0236634 A1 | 8/2015 | Han et al. |

FOREIGN PATENT DOCUMENTS

| | | |
|---|---|---|
| DE | 2745824 B1 | 3/1979 |
| DE | 3637480 A1 | 5/1988 |
| DE | 19524985 A1 | 8/1996 |
| DE | 102010008978 A1 | 8/2011 |
| EP | 2608383 A1 | 6/2013 |
| EP | 2608395 A1 | 6/2013 |
| EP | 2608397 A1 | 6/2013 |
| EP | 2608398 A1 | 6/2013 |
| EP | 2887517 A1 | 6/2015 |

OTHER PUBLICATIONS

International Search Report and Written Opinion, PCT/US2017/035464, dated Jul. 18, 2017, ABB Schweiz AG, 8 pages.

* cited by examiner

*Primary Examiner* — Karen Masih
(74) *Attorney, Agent, or Firm* — Taft Stettinius & Hollister LLP

(57) ABSTRACT

A bridge converter for a multi-phase electrical machine has a number of bridge cells connected in series. Each bridge cell has a controller. The bridge converter includes a sensor operative to provide a commutation signal to at least one controller. A multi-phase electrical machine has a plurality of stator windings and a bridge converter having a number of bridge cells connected in series. Each bridge cell has a controller. The bridge converter includes a sensor operative to provide a commutation signal to at least one controller.

20 Claims, 3 Drawing Sheets

BRUSHLESS ELECTRICAL MACHINE

TECHNICAL FIELD

The present application generally relates to electrical machines, and more particularly, but not exclusively, to brushless electrical machines.

BACKGROUND

Electrical machines such as motors and generators remain an area of interest. Some existing systems have various shortcomings, drawbacks and disadvantages relative to certain applications. For example, in some electrical machines, switching cost and complexity may be reduced. Accordingly, there remains a need for further contributions in this area of technology.

SUMMARY

One embodiment of the present invention is a unique bridge converter for a multi-phase electrical machine. Another embodiment is unique multi-phase electrical machine. Other embodiments include apparatuses, systems, devices, hardware, methods, and combinations for electrical machines and power converters. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
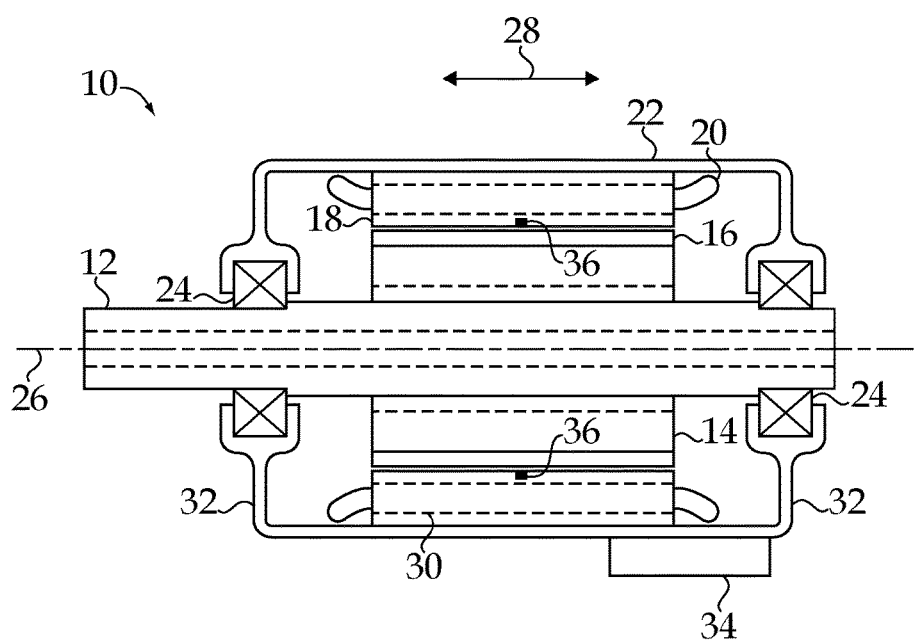
FIG. 1 schematically depicts some aspects of a non-limiting example of an electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a multi-phase variable speed permanent magnet motor. In other embodiments, electrical machine 10 may be a motor and/or a generator, and may be any type of electrical machine, such as a switched reluctance motor or an induction motor or any other type of motor, generator or motor/generator. In various embodiments, electrical machine 10 may be a radial flux machine, an axial flux machine or a machine having a three-dimensional (3D) flux path. Electrical machine 10 includes a shaft 12, a rotor 14 having permanent magnets (poles) 16, a stator 18 having stator windings 20, a housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28.

Rotor 14 and stator 18 are in magnetic communication with each other. Each of rotor 14/poles 16 and stator 18 have a construction that is operative to direct magnetic flux toward and from each other. In some embodiments, rotor 14 may include other operative sources of magnetic flux, e.g., bus bars, windings or both, in conjunction with or in place of permanent magnets 16. In one form, permanent magnets 16 are surface mount ferrite magnets. In other embodiments, other configurations and/or compositions may be employed, e.g., including embedded configurations and/or rare earth magnet compositions.

Stator windings 20 are disposed within passages 30 in stator 18. In one form, stator windings 20 are copper conductors. In other embodiments, aluminum and/or other conductor materials may be employed in addition to or in place of copper. Windings 20 are constructed for magnetic communication with poles 16. In one form, passages 30 are linear, and extend through the length of stator 18 in axial direction 28. In other embodiments, passages 30 may be skewed, may be radial passages or may be passages having a centerline that extends in any two or more of axial, radial and circumferential directions through all or part of stator 18. In some embodiments, stator 18 may include other passages in addition to passages 30, e.g., cooling passages or other passages. In some embodiments, passages 30 may be also constructed to allow a flow of a cooling medium therethrough.

In one form, bearings 24 are mounted in and supported by end plates 32 of housing 22. In other embodiments, bearings 24 may be mounted and coupled to housing 22 via one or more other structures and/or integral features of housing 22. Bearings 24 are constructed to react shaft 12 and rotor 14 axial or thrust loads in direction 28, and to react shaft 12 and rotor 14 radial loads perpendicular to axis of rotation 26. Housing 22 is constructed to enclose stator 18 and react loads associated with stator 18, e.g., loads generated due to magnetic interaction between stator 18 and rotor 14.

Electrical machine 10 includes a bridge converter 34 and a plurality of sensors 36. Bridge converter 34 is a series-connected bridge converter in communication with windings 20, and operative to supply electrical power signals to windings 20. Sensors 36 are in communication with bridge converter 34. Sensors 36 are constructed to detect rotor 14 position and to provide commutation signals to bridge converter 34 for commutating windings 20 based on rotor 14 position. In one form, sensors 36 are Hall Effect sensors. Hall Effect sensors are relatively low cost sensors that may be used to provide rotor position detection/signaling. In other embodiments, other sensors or commutation signal systems may be employed, e.g., encoders such as wheel encoders, or one or more other sensors/systems/devices capable of detecting rotor position and providing a commutation signal based thereon.

Figure 2:
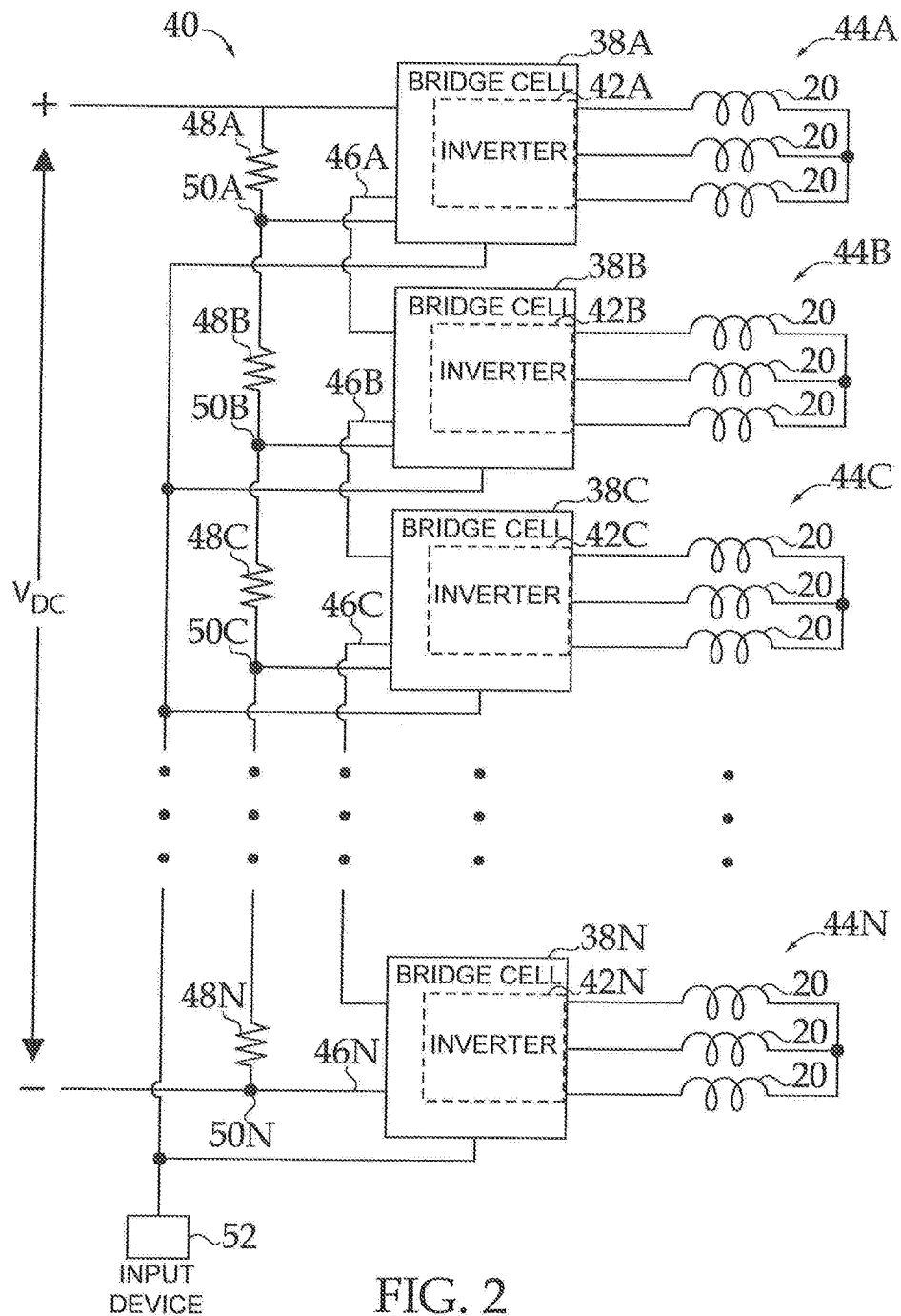
FIG. 2 schematically illustrates some aspects of a non-limiting example of a bridge converter in accordance with an embodiment of the present invention.

Referring to FIG. 2, some aspects of a non-limiting example of a bridge converter 34 in accordance an embodiment of the present invention are schematically illustrated. Bridge converter 34 includes a number, N, of bridge cells 38, and a voltage divider 40. Bridge cells 38 are coupled in series. The number, N, of bridge cells may vary with the needs of the application. For example, in some embodiments, N=8, whereas in other embodiments, N may be any value suitable for the particular application. Bridge cells 38 are identified in FIG. 2 as bridge cells 38A, 38B, 38C . . . 38N. Each bridge cell 38 includes a multi-phase inverter 42 coupled to a subset 44 of stator windings 20, illustrated as inverters 42A, 42B, 42C . . . 42N and subsets 44A, 44B, 44C . . . 44N, respectively, corresponding to bridge cells 38A, 38B, 38C . . . 38N, respectively, in FIG. 2. In the non-limiting example of FIG. 2, multi-phase inverters 42 are 3-phase inverters coupled to subsets 44 having three (3) windings 20 each. In other embodiments, other numbers of phases and suitable number of windings may be employed. In one form, multi-phase inverters 42 are square wave inverters, and supply square wave power signals to windings 20. In other embodiments, other waveforms may be employed. In one form, multi-phase inverters 42 are not pulse-width modulated (PWM). In other embodiments, multi-phase inverters 42 may be PWM inverters, and may output sine wave power signals and/or power signals having other waveforms, including square wave and/or trapezoidal wave power signals.

Bridge cells 38 are coupled in series to a power source, $V_{DC}$, for powering bridge converter 34 and electrical machine 10. In one form, $V_{DC}$ is a DC voltage supply. In other embodiments, $V_{DC}$ may be a rectified AC voltage source, e.g., providing a DC voltage superimposed with an AC ripple component. Because bridge cells 38 and hence multi-phase inverters 42 are coupled in series, the voltage drop or potential difference across each bridge cell and inverter is $V_{DC}/N$, and hence, inverters 42 supply power to subsets 44 of windings 20 at a voltage $V_{DC}/N$. In other embodiments, the inverter cells may be coupled in a combination series/parallel relationship. For example, in some embodiments, groups of inverter cells may be coupled in series, wherein the inverter cells within each group are arranged in parallel with each other, and wherein each group is arranged in series with respect to other groups. In such a case, N pertains to the number of groups that are arranged in series with respect to each other.

Figure 3:
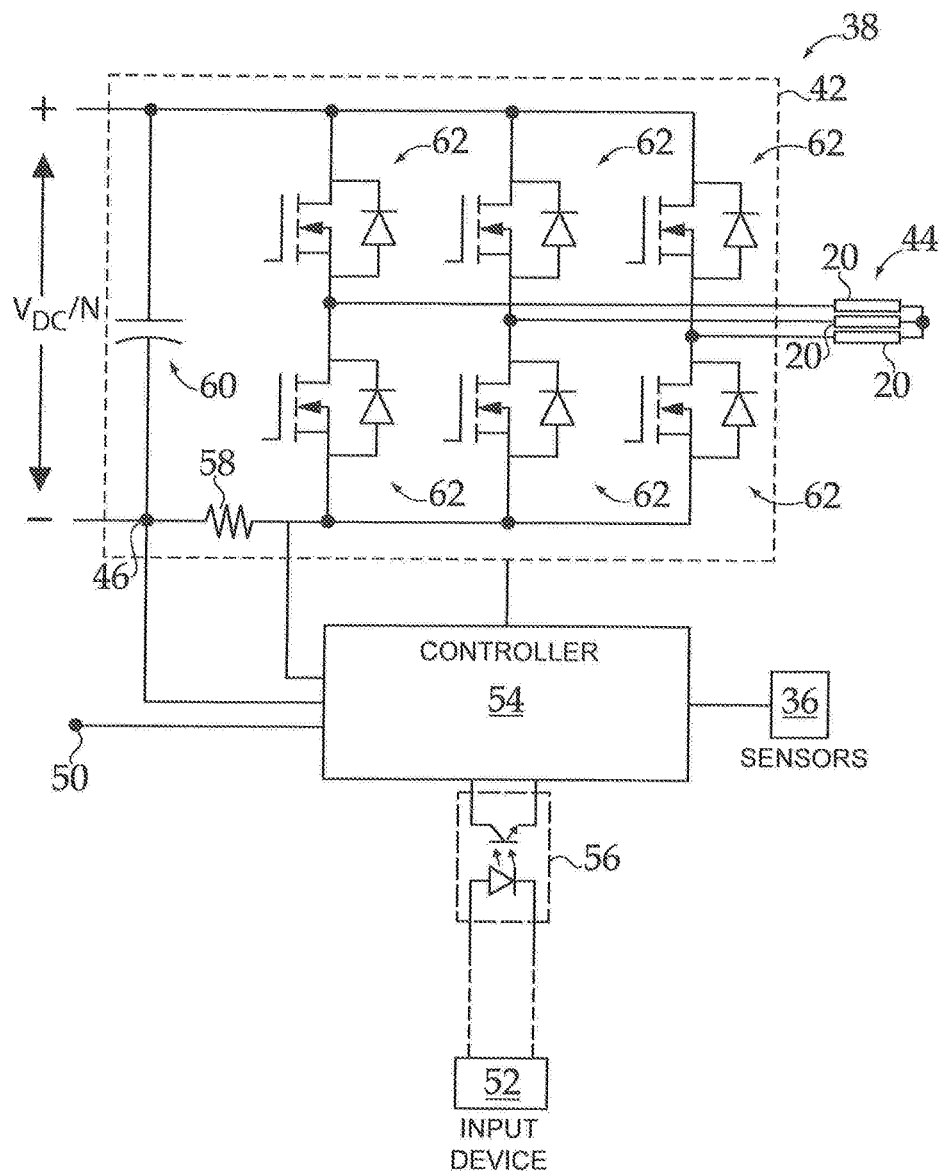
FIG. 3 schematically illustrates some aspects of a non-limiting example of a bridge cell in accordance with an embodiment of the present invention.

Each bridge cell 38 has a low voltage side, where current is discharged from the bridge cell, which functions as a local ground 46. Local grounds 46 are identified in FIG. 2 as local grounds 46A, 46B, 46C . . . 46N, corresponding to bridge cells 38A, 38B, 38C . . . 38N, respectively. Each inverter 42 is coupled to the local ground 46 for the respective bridge cell 38, e.g., via a shunt resistor 58 (FIG. 3). For example, inverters 42A, 42B, 42C . . . 42N are coupled to local grounds 46A, 46B, 46C . . . 46N, respectively. Local ground 46 is effectively a ground for the corresponding bridge cell 38 and the components thereof. The local ground 46 for each bridge cell 38 is at a different potential than the local grounds for other bridge cells 38. Thus, each bridge cell 38 has a different ground potential than other bridge cells 38.

Voltage divider 40 is coupled to $V_{DC}$ in parallel to the series-connected bridge cells 38. Voltage divider 40 includes N segments 48. The potential difference across each segment 48 is thus $V_{DC}/N$. Segments 48 are illustrated in FIG. 2 as segments 48A, 48B, 48C . . . 48N, corresponding to respective ones of the N series-connected bridge cells 38 and hence inverters 42, e.g., bridge cells 38A, 38B, 38C . . . 38N and inverters 42A, 42B, 42C . . . 42N, respectively. Each segment 48 has a local ground reference 50 at the low voltage side of the segment, identified in FIG. 2 as local ground references 50A, 50B, 50C . . . 50N, corresponding to bridge cells 38A, 38B, 38C . . . 38N, respectively.

Each bridge cell 38 is supplied with a common torque/speed demand signal, that is, a torque/speed command signal common to each bridge cell 38. The torque/speed demand signal is supplied from a input device 52, e.g., a manual torque/speed input device, such as a keyboard or joystick, a controller, or any other suitable demand signal source. Input device 52 is isolated from each bridge cell 38, e.g., optically isolated. Input device 52 is common to all bridge cells 38, that is, all of the bridge cells 38, e.g., bridge cells 38A, 38B, 38C . . . 38N, receive the torque/speed command signal from the same or common input device 52.

Referring to FIG. 3, some aspects of a non-limiting example of a bridge cell 38 in accordance with an embodiment of the present invention are schematically illustrated. Bridge cell 38 of FIG. 3 may be any of the bridge cells illustrated in FIG. 2. Each bridge cell 38 includes, in addition to a multi-phase inverter 42, a controller 54 and an isolator 56, e.g., an optocoupler or other signal isolation device. In some embodiments, each bridge cell 38 may also include a shunt current sensor 58 and/or a DC link capacitor 60. Various embodiments may include additional components not illustrated in FIG. 3.

Inverter 42 includes a plurality of switching devices 62. In one form, inverter 42 employs low voltage MOSFETs as switching devices. In other embodiments, other switching devices may be used in addition to or in place of MOSFETs, e.g., IGBT and/or GaN switching devices. In one form, inverter 42 in the form of a 3-phase inverter employs a quantity of six (6) switching devices 62. In other embodiments, inverter 42 may have any number of phases and employ any suitable number of switching devices 62.

Controller 54 is communicatively coupled to following components corresponding to the particular bridge cell 38: the Hall Effect sensor 36; inverter 42 (on both sides of shunt current sensor 58); local ground 46; and optocoupler 56. Optocoupler 56 is communicatively coupled to input device 52, and is operative to optically isolate and supply the common torque/speed demand signal to controller 54, that is, the same demand signal supplied to the other controllers 54 of bridge converter 34.

Controller 54 is communicatively coupled to inverter 42. Controller 54 is also coupled to local ground 46 for bridge cell 38. Controller 54 is constructed to provide control signals for operating inverter 42. In one form, controller 54 is a brushless DC (BLDC) controller. In other embodiments, controller 54 may be a permanent magnet synchronous motor (PMSM) controller in addition to or in place of a BLDC controller. In still other embodiments, controller 54 may take other forms. In one form, controller 54 is communicatively coupled to switching devices 62 of inverter 42, and is constructed to provide control signals for operating inverter 42, e.g., to provide gate drive signals to switching devices 62. In other embodiments, controller 54 may provide control signals to a separate gate driver that provides gate drive signals to switching devices 62. In one form, controller 54 provides gate drive signals to generate a square wave output from inverter 42 and hence bridge cell 38. In other embodiments, controller 54 may provide gate drive signals to generate other waveforms as outputs of inverter 42. In one form, controller 54 is not a PWM controller, which may reduce electrical machine 10 cost in some embodiments. In other embodiments, controller 54 may be a PWM controller, and may provide gate drive signals to generate any suitable waveform output from inverter 42, e.g., sine waves. Controller 54 is not isolated from inverter 42.

Sensor 36 is communicatively coupled to controller 54 and operative to provide commutation signals to controller 54 for controlling the output of switching devices 62/inverter 42. Controller 54 is constructed to provide the control signals for operating inverter 42 based at least in part on the commutation signals from sensor 36. In one form, sensor 36 is not isolated from controller 54. In other embodiments, sensor 36 may be isolated from controller 54, e.g., optically isolated. For example, in the illustrated embodiment, a sensor 36 is employed for each bridge cell 38. However, in some embodiments, a sensor 36 may be coupled to more than one bridge cell 38, e.g., for bridge cells that do not have a phase shift relative to each other, or for bridge cells that are 180° out of phase. In such embodiments, the sensors 36 would be isolated from one or more of the bridge cells 38, e.g., because the bridge cells 38 have local grounds 46 at different potentials. Because Hall Effect sensors are relatively inexpensive compared to optocouplers or other isolation devices, in some embodiments, it may be preferable to reduce overall cost of the electrical machine and/or bridge converter by employing a Hall Effect sensor 36 for each bridge cell 38, e.g., grounded to local ground 46 for each bridge cell 38, which would not require the use of optocouplers or other isolators between the sensor 36 and the bridge cell 38/controller 54.

Controller 54 is coupled to local ground reference 50 of segment 48. Controller 54 is constructed to detect a bridge cell 38 voltage imbalance based on comparing an actual voltage at the local ground 46 of the corresponding one of the N bridge cells 38 to a reference voltage at the local ground reference 50 for the corresponding one of the N bridge cells 38. For example, under completely nominal electrical machine 10 and bridge cell 38 build conditions, bridge cell voltage is self-balanced. However, imbalance may be introduced for one of various reasons, such as parameter mismatch or tolerances. For instance, air gap differences in or between the rotor and stator, eccentricities in the rotor and/or stator, rotor misalignment or centerline offset, variations in electrical/electronic parameters in windings 20, bridge cells 38 components etc., may cause an imbalance in the output of one or more bridge cells 38. Controller 54 is constructed to selectively increase or decrease the power output of the corresponding one of the N bridge cells 38 to balance the bridge cell 38. The power output is increased or decreased based on a comparison of an actual voltage at the local ground 46 for the bridge cell 38 with the reference voltage at the local ground reference 50 for the segment 48 associated with the corresponding bridge cell 38, e.g., the voltage at local grounds 46A, 46B, 46C . . . 46N being compared with local ground references 50A, 50B, 50C . . . 50N, respectively, corresponding to bridge cells 38A, 38B, 38C . . . 38N, respectively. The balancing may be performed, for example, by controller 54 modulating gate drive signals supplied to inverter 42 for the bridge cell to increase or decrease the power output based on the comparison of the local ground with the local ground reference.

Because each controller 54 is coupled to local ground 46 for each bridge cell 38, controller 54 does not need to be isolated from inverter 42, which may reduce costs in some embodiments. For example, with an inverter 42 having six (6) switching devices 62, there would be six (6) isolation devices, e.g., optocouplers, otherwise required to isolate controller 54 from switching devices 62 of each inverter 42. Thus, for example, for a bridge converter having eight (8) 3-phase inverters, 48 isolation devices, e.g., optocouplers, may be required (e.g., eight (8) inverters times six (6) switching devices per inverter at one isolation device per switching device), as opposed to as few as only eight (8) isolation devices or less, e.g., one for each torque/speed command input for each bridge cell 38, in embodiments where controllers 54 are coupled to local grounds 46. In some cases (having eight (8) bridge cells, for example), only seven (7) isolation devices may be required, e.g., in embodiments where input device 52 is at the same ground level as the local ground 46 for one of the bridge cells, e.g., bridge cell 38N.

In addition, because the voltage drop across each bridge cell 38 is lower than the supply voltage $V_{DC}$, a plurality of low cost inverters, e.g., MOSFET inverters may be employed, instead of a more costly high power inverter. For example, for a 1200 $V_{DC}$ power supply, a quantity of 12 low cost 3-phase 100 V MOSFET inverters with associated low cost controllers may be employed, rather than a substantially more expensive 1200 V IGBT inverter and corresponding inverter. Also, some embodiments are scalable, e.g., by adding one or more additional bridge cells 38 in series, and/or by adding one or more bridge cells 38 in parallel to existing bridge cells 38. In some embodiments where additional bridge cells are added in parallel, the same controller 54 may be used to provide control signals, e.g., gate drive signals or signals to control a separate gate driver for the additional one or more added parallel bridge cells.

Embodiments of the present invention include a bridge converter for a multi-phase electrical machine having a plurality of stator windings, the bridge converter being supplied with a DC voltage, $V_{DC}$, comprising: a number, N, of bridge cells coupled in series, each bridge cell having a multi-phase inverter coupled to a subset of the stator windings and operative to supply power to the subset at a voltage $V_{DC}/N$, each bridge cell having a local ground at a different potential than other local grounds corresponding to other bridge cells, wherein the multi-phase inverter is coupled to the local ground for the bridge cell; and each bridge cell further having a controller coupled to the local ground and to the multi-phase inverter, and constructed to provide control signals for operating the multi-phase inverter.

In a refinement, the bridge converter further comprises a voltage divider having N segments, each segment corresponding to one of the N bridge cells, the potential difference across each segment being $V_{DC}/N$, each segment having a local ground reference coupled to the controller of the corresponding one of the N bridge cells.

In another refinement, the controller is constructed to detect a bridge cell voltage imbalance based on comparing an actual voltage at the local ground of the corresponding one of the N bridge cells with a reference voltage at the local ground reference for the corresponding one of the N bridge cells.

In yet another refinement, the controller is constructed to selectively increase or decrease a power output of the corresponding one of the N bridge cells based on a comparison of an actual voltage at the local ground for the corresponding one of the N bridge cells with a reference voltage at the local ground reference for the corresponding one of the N bridge cells.

In still another refinement, the bridge converter further comprises an isolation device in communication with each controller and operative to isolate and supply a same demand signal to each controller.

In yet still another refinement, each bridge cell includes switching devices; and wherein the controller of each of the corresponding one of the N bridge cells is constructed to provide gate drive signals to the switching devices.

In a further refinement, the controller is not isolated from the multi-phase inverter.

In a yet further refinement, the electrical machine includes a sensor operative to provide a commutation signal; wherein the controller is coupled to the sensor and operative to receive the commutation signal and provide the control signals based on the commutation signal; and wherein the sensor is not isolated from the controller.

Embodiments of the present invention include a multi-phase electrical machine powered by a DC voltage, $V_{DC}$, comprising: a plurality of stator windings; a bridge converter having a number, N, of bridge cells coupled in series, each bridge cell having a multi-phase inverter coupled to a subset of the stator windings and operative to supply power to the subset at a voltage $V_{DC}/N$, each bridge cell having a local ground at a different potential than other local grounds corresponding to other bridge cells, wherein the multi-phase inverter is coupled to the local ground for the bridge cell; each bridge cell further having a controller coupled to the local ground and to the multi-phase inverter, and constructed to provide control signals for operating the multi-phase inverter; and a sensor operative to provide a commutation signal to at least one of the controllers.

In a refinement, the electrical machine further comprises a voltage divider having N segments, each segment corresponding to one of the N bridge cells, the potential difference across each segment being $V_{DC}/N$, each segment having a local ground reference coupled to the controller of the corresponding one of the N bridge cells.

In another refinement, each controller is constructed to detect a bridge cell voltage imbalance based on comparing an actual voltage at the local ground of the corresponding one of the N bridge cells with a reference voltage at the local ground reference for the corresponding one of the N bridge cells.

In yet another refinement, each controller is constructed to selectively increase or decrease a power output of the corresponding one of the N bridge cells based on a comparison of an actual voltage at the local ground for the corresponding one of the N bridge cells with a reference voltage at the local ground reference for the corresponding one of the N bridge cells.

In still another refinement, the electrical machine further comprises an optocoupler in communication with each controller and operative to optically isolate and supply a same demand signal to each controller.

In yet still another refinement, each bridge cell includes switching devices; and wherein the controller of each of the corresponding one of the N bridge cells is constructed to provide gate drive signals to the switching devices.

In a further refinement, the controller is not optically isolated from the multi-phase inverter.

In a yet further refinement, the sensor is not isolated from the controller.

In a still further refinement, the electrical machine further comprises a sensor operative to provide a commutation signal to at least one of the controllers.

In a yet still further refinement, the sensor is optically isolated from the at least one of the controllers.

Embodiments of the present invention include an electrical machine, comprising: a plurality of stator windings; a plurality of bridge cells coupled in series, each bridge cell having a multi-phase inverter coupled to a subset of the stator windings and operative to supply power to the subset; and means for controlling the multi-phase inverters, wherein the means for controlling the multi-phase inverters is not isolated from the multi-phase inverters.

In a refinement, the electrical machine further comprises means for balancing a power output of at least one of the bridge cells.

In another refinement, the electrical machine further comprises a sensor operative to provide a commutation signal to the means for controlling.

In yet another refinement, the sensor is not isolated from the means for controlling.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A bridge converter for a multi-phase electrical machine having a plurality of stator windings, the bridge converter being supplied with a DC voltage, $V_{DC}$, comprising:
    a number, N, of bridge cells coupled in series, each bridge cell having a multi-phase inverter coupled to a subset of the stator windings and operative to supply power to the subset at a voltage $V_{DC}/N$ each bridge cell having a local ground at a different potential than other local grounds corresponding to other bridge cells, wherein the multi-phase inverter is coupled to the local ground for the bridge cell; and
    each bridge cell further having a controller coupled to the local ground and to the multi-phase inverter, and constructed to provide control signals for operating the multi-phase inverter.

2. The bridge converter of claim 1, further comprising a voltage divider having N segments, each segment corresponding to one of the N bridge cells, the potential difference across each segment being $V_{DC}/N$, each segment having a local ground reference coupled to the controller of the corresponding one of the N bridge cells.

3. The bridge converter of claim 2, wherein the controller is constructed to detect a bridge cell voltage imbalance based on comparing an actual voltage at the local ground of the corresponding one of the N bridge cells with a reference voltage at the local ground reference for the corresponding one of the N bridge cells.

4. The bridge converter of claim 2, wherein the controller is constructed to selectively increase or decrease a power output of the corresponding one of the N bridge cells based on a comparison of an actual voltage at the local ground for the corresponding one of the N bridge cells with a reference voltage at the local ground reference for the corresponding one of the N bridge cells.

5. The bridge converter of claim 1, further comprising an isolation device in communication with each controller and operative to isolate and supply a same demand signal to each controller.

6. The bridge converter of claim 1, wherein each bridge cell includes switching devices; and wherein the controller of each of the corresponding one of the N bridge cells is constructed to provide gate drive signals to the switching devices.

7. The bridge converter of claim 6, wherein the controller is not isolated from the multi-stage inverter.

8. The bridge converter of claim 1, wherein the electrical machine includes a sensor operative to provide a commutation signal; wherein the controller is coupled to the sensor and operative to receive the commutation signal and provide the control signals based on the commutation signal; and wherein the sensor is not isolated from the controller.

9. A multi-phase electrical machine powered by a DC voltage, $V_{DC}$, comprising:
   a plurality of stator windings;
   a bridge converter having a number, N, of bridge cells coupled in series, each bridge cell having a multi-phase inverter coupled to a subset of the stator windings and operative to supply power to the subset at a voltage $V_{DC}/N$, each bridge cell having a local ground at a different potential than other local grounds corresponding to other bridge cells, wherein the multi-phase inverter is coupled to the local ground for the bridge cell;
   each bridge cell further having a controller coupled to the local ground and to the multi-phase inverter, and constructed to provide control signals for operating the multi-phase inverter; and
   a sensor operative to provide a commutation signal to at least one of the controllers.

10. The electrical machine of claim 9, further comprising a voltage divider having N segments, each segment corresponding to one of the N bridge cells, the potential difference across each segment being $V_{DC}/N$, each segment having a local ground reference coupled to the controller of the corresponding one of the N bridge cells.

11. The electrical machine of claim 10, wherein each controller is constructed to detect a bridge cell voltage imbalance based on comparing an actual voltage at the local ground of the corresponding one of the N bridge cells with a reference voltage at the local ground reference for the corresponding one of the N bridge cells.

12. The electrical machine of claim 10, wherein each controller is constructed to selectively increase or decrease a power output of the corresponding one of the N bridge cells based on a comparison of an actual voltage at the local ground for the corresponding one of the N bridge cells with a reference voltage at the local ground reference for the corresponding one of the N bridge cells.

13. The electrical machine of claim 9, further comprising an optocoupler in communication with each controller and operative to optically isolate and supply a same demand signal to each controller.

14. The electrical machine of claim 9, wherein each bridge cell includes switching devices; and wherein the controller of each of the corresponding one of the N bridge cells is constructed to provide gate drive signals to the switching devices.

15. The electrical machine of claim 14, wherein the controller is not optically isolated from the multi-phase inverter.

16. The electrical machine of claim 9, wherein the sensor is not isolated from the controller.

17. An electrical machine, comprising:
   a plurality of stator windings of the electrical machine;
   a plurality of bridge cells of the electrical machine, the plurality of bridge cells coupled in series, each bridge cell having a multi-phase inverter coupled to a subset of the stator windings of the electrical machine and operative to supply power to the subset; and
   means for controlling the multi-phase inverters, wherein the means or controlling the multi-phase inverters is not isolated from the multi-phase inverters.

18. The electrical machine of claim 17, further comprising means for balancing a power output of at least one of the bridge cells.

19. The electrical machine of claim 17, further comprising a sensor operative to provide a commutation signal to the means for controlling.

20. The electrical machine of claim 19, wherein the sensor is not isolated from the means for controlling.

* * * * *